United States Patent
Moroga et al.

(10) Patent No.: US 11,012,279 B2
(45) Date of Patent: May 18, 2021

(54) USER EQUIPMENT AND UPLINK SIGNAL TRANSMISSION METHOD

(71) Applicant: NTT DOCOMO, INC., Tokyo (JP)

(72) Inventors: Hideyuki Moroga, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/345,414

(22) PCT Filed: Aug. 25, 2017

(86) PCT No.: PCT/JP2017/030476
§ 371 (c)(1),
(2) Date: Apr. 26, 2019

(87) PCT Pub. No.: WO2018/083868
PCT Pub. Date: May 11, 2018

(65) Prior Publication Data
US 2019/0253298 A1    Aug. 15, 2019

(30) Foreign Application Priority Data

Nov. 2, 2016  (JP) .............................. JP2016-215707

(51) Int. Cl.
*H04L 27/26* (2006.01)
*H04W 76/27* (2018.01)
(Continued)

(52) U.S. Cl.
CPC .......... *H04L 27/2636* (2013.01); *H04L 27/26* (2013.01); *H04W 8/22* (2013.01);
(Continued)

(58) Field of Classification Search
CPC ... H04L 27/26; H04L 27/2636; H04L 5/0007; H04W 28/18; H04W 48/12; H04W 72/04; H04W 76/27; H04W 8/22; H04W 72/12
(Continued)

(56) References Cited

U.S. PATENT DOCUMENTS

| 2010/0232382 A1* | 9/2010 | Gauvreau ............. H04W 72/02 370/329 |
| 2012/0034927 A1* | 2/2012 | Papasakellariou .... H04W 52/32 455/450 |

(Continued)

FOREIGN PATENT DOCUMENTS

| EP | 2496032 A1 | 9/2012 |
| EP | 2557879 A1 | 2/2013 |

(Continued)

OTHER PUBLICATIONS

International Search Report issued for PCT/JP2017/030476, dated Nov. 14, 2017 (5 pages).

(Continued)

*Primary Examiner* — Gbemileke J Onamuti
(74) *Attorney, Agent, or Firm* — Osha Bergman Watanabe & Burton LLP (57) ABSTRACT

A user equipment according to one embodiment of the present invention includes a reception unit that receives signal waveform configuration information related to either or both of a multicarrier scheme and a single carrier scheme to be applicable in uplink communication from a base station, a setting unit that sets the received signal waveform configuration information, and a transmission unit that transmits an uplink signal in accordance with the set signal waveform configuration information.

6 Claims, 4 Drawing Sheets

(51) Int. Cl.
| | |
|---|---|
| *H04W 8/22* | (2009.01) |
| *H04W 28/18* | (2009.01) |
| *H04W 48/16* | (2009.01) |
| *H04W 48/12* | (2009.01) |
| *H04W 72/04* | (2009.01) |
| *H04W 72/12* | (2009.01) |
| *H04L 5/00* | (2006.01) |

(52) U.S. Cl.
CPC .......... *H04W 28/18* (2013.01); *H04W 48/12* (2013.01); *H04W 48/16* (2013.01); *H04W 72/04* (2013.01); *H04W 72/12* (2013.01); *H04W 76/27* (2018.02); *H04L 5/0007* (2013.01)

(58) Field of Classification Search
USPC ........................................................ 370/329
See application file for complete search history.

(56) References Cited

U.S. PATENT DOCUMENTS

| | | | |
|---|---|---|---|
| 2012/0281650 A1* | 11/2012 | Ouchi ................... | H04W 52/04 370/329 |
| 2013/0128857 A1* | 5/2013 | Nakao ................... | H04L 5/0053 370/329 |
| 2013/0182673 A1 | 7/2013 | Takeda et al. | |
| 2014/0146754 A1 | 5/2014 | Bayesteh et al. | |
| 2015/0282008 A1 | 10/2015 | Cao et al. | |

FOREIGN PATENT DOCUMENTS

| | | |
|---|---|---|
| EP | 2675232 A2 | 12/2013 |
| JP | 2012044331 A | 3/2012 |

OTHER PUBLICATIONS

Written Opinion issued for PCT/JP2017/030476, dated Nov. 14, 2017 (5 pages).
InterDigital Communications; "Coexistence of CP OFDM and CP DFT-s-OFDM for NR UL"; 3GPP TSG RAN WG1 Meeting #86bis R1-1609887; Lisbon, Portugal, Oct. 10-14, 2016 (5 pages).
3GPP TS 36.201 V8.3.0; "3rd Generation Partnership Project; Technical Specification Group Radio Access Network; Evolved Universal Terrestrial Radio Access (E-UTRA); LTE Physical Layer—General Description (Release 8)"; Mar. 2009 (13 pages).
3GPP TS 36.213 V14.0.0; "3rd Generation Partnership Project; Technical Specification Group Radio Access Network; Evolved Universal Terrestrial Radio Access (E-UTRA); Physical layer procedures (Release 14)"; Sep. 2016 (406 pages).
3GPP TS 36.211 V14.0.0; "3rd Generation Partnership Project; Technical Specification Group Radio Access Network; Evolved Universal Terrestrial Radio Access (E-UTRA); Physical channels and modulation (Release 14)"; Sep. 2016 (170 pages).
Office Action issued in the counterpart Japanese Patent Application No. 2018-548570, dated Mar. 17, 2020 (7 pages).
Extended European Search Report issued in counterpart European Patent Application No. 17868442.9, dated Jun. 2, 2020 (7 pages).
Office Action issued in the counterpart Japanese Patent Application No. 2018-548570, dated Jan. 5, 2021 (6 pages).
Panasonic; "NR waveform evaluation and proposals"; 3GPP TSG RAN WG1 Meeting #86, R1-167337; Gothenburg, Sweden, Aug. 22-26, 2016 (21 pages).

* cited by examiner

USER EQUIPMENT AND UPLINK SIGNAL TRANSMISSION METHOD

TECHNICAL FIELD

The present invention relates to a user equipment and an uplink signal transmission method.

BACKGROUND ART

In a radio communication system of a long term evolution (LTE) scheme, orthogonal frequency division multiple access (OFDMA) is employed for downlink communication, and single carrier-frequency division multiple access (SC-FDMA) is employed for uplink communication (Non-Patent Document 1).

Particularly, in uplink communication, an SC-FDMA scheme capable of suppressing a peak-to-average power ratio (PAPR) to a low level is employed, and discrete Fourier transform-spread-orthogonal frequency division multiplexing (DFT-s-OFDM) is used as a technique of generating an uplink signal in a frequency domain. In DFT-s-OFDM, single carrier transmission is implemented in OFDM transmission by providing discrete Fourier transform (DFT) prior to inverse fast Fourier transform (IFFT).

PRIOR-ART DOCUMENTS

Non-Patent Documents

[Non-Patent Document 1] 3GPP TS36.201, V8.3.0 (2009-03)

DISCLOSURE OF INVENTION

Problem(s) to be Solved by the Invention

In a next generation radio communication system, it is necessary to satisfy requirements for high speed communication and large capacity, and for example, in a fifth generation radio communication system, a peak data rate of 10 Gbps is desired. In order to satisfy these requirements, it is expected that a user equipment which can apply a multicarrier scheme using OFDM to uplink communication will be developed.

Since OFDM differs from DFT-s-OFDM in a generation technique and a decoding technique of uplink signals, unless it is appropriately set whether OFDM is used or DFT-s-OFDM is used between a base station and a user equipment, uplink signals are unable to be received by the base station.

It is an object of the present invention to implement transmission and reception of uplink signals between a base station and a user equipment in a radio communication system in which a single carrier scheme and a multicarrier scheme are applicable in uplink communication, by setting a suitable scheme in uplink communication.

Means for Solving the Problem(s)

A user equipment according to one embodiment of the present invention includes a reception unit that receives signal waveform configuration information related to either or both of a multicarrier scheme and a single carrier scheme to be applicable in uplink communication from a base station, a setting unit that sets the received signal waveform configuration information, and a transmission unit that transmits an uplink signal in accordance with the set signal waveform configuration information.

Advantageous Effect of the Invention

According to the present invention, it is possible to implement transmission and reception of uplink signals between a base station and a user equipment in a radio communication system in which a single carrier scheme and a multicarrier scheme are applicable in uplink communication, by setting a suitable scheme in uplink communication.

DETAILED DESCRIPTION OF THE EMBODIMENTS

Hereinafter, an embodiment of the present invention will be described with reference to the accompanying drawings. An embodiment to be described below is merely an example, and an embodiment to which the present invention is applied is not limited to the following embodiment. For example, a radio communication system according to the present embodiment is supposed to be a successor radio communication system of LTE, but the present invention is not limited to the successor radio communication system of LTE and can be also applied to other systems.

<System Configuration>

Figure 1:
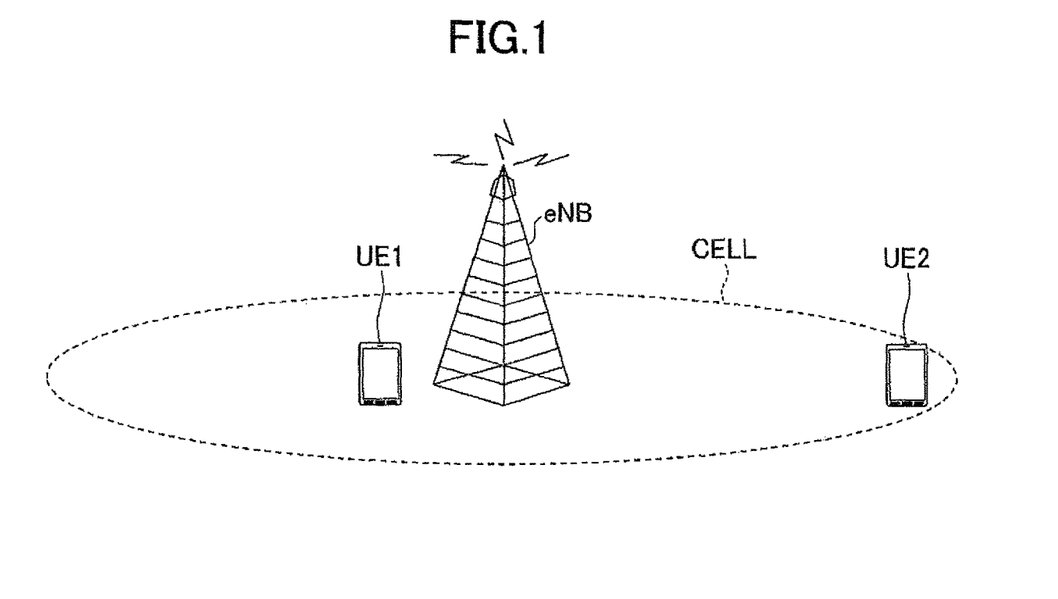
FIG. 1 is a schematic diagram illustrating a configuration example of a radio communication system according to an embodiment of the present invention.

FIG. 1 is a schematic diagram illustrating a configuration example of a radio communication system according to an embodiment of the present invention. As illustrated in FIG. 1, the radio communication system according to the embodiment of the present invention includes a base station eNB and user equipments UE1 and UE2. In the example of FIG. 1, one base station eNB and two user equipments UE1 and UE2 (which are collectively referred to as "UE") are illustrated, but a plurality of base stations eNBs and one user equipment or three or more user equipments UEs may be included.

The base station eNB can accommodate one or more (for example, three) cells (which is also referred to as "sectors"). When the base station eNB accommodates a plurality of cells, the entire coverage area of the base station eNB can be partitioned into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" may be used interchangeably in this specification. The base station eNB is also referred to as a fixed station, a Node B, an eNode B (eNB), an access point, a femtocell, a small cell, or the like.

The user equipment UE is also referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other appropriate term, by those having skill in the art.

The base station eNB and the user equipment UE perform downlink (DL) communication and uplink (UL) communication using a predetermined band.

First, main channels used for downlink communication will be described.

It is necessary for the user equipment UE to receive broadcast information that is basic information in order to communicate with the base station eNB. The broadcast information includes a master information block (MIB) including a system bandwidth, a system frame number, and the like and a system information block (SIB) that is another kind of system information. The SIB may be transmitted by a downlink data channel which will be described later.

The user equipment UE receives downlink control information (DCI) including allocation of a resource or the like using a downlink control channel. The downlink control channel may be referred to as a physical downlink control channel (PDCCH).

The user equipment UE receives downlink data using a downlink shared channel (downlink data channel). The downlink shared channel may be referred to as a physical downlink shared channel (PDSCH).

Next, main channels used for uplink communication will be described.

The user equipment UE transmits uplink control information including ACK/NACK for the PDSCH, reception quality of the downlink channel, a scheduling assignment request, and the like, using an uplink control channel. The uplink control channel may be referred to as a physical uplink control channel (PUCCH).

Further, the user equipment UE transmits uplink data using an uplink shared channel (uplink data channel). The uplink shared channel may be referred to as a physical uplink shared channel (PUSCH).

The channels and the signals mentioned above are examples in LTE, and names different from those mentioned above may be used.

The channels and the signals are transmitted, for example, in predetermined portions in resources configured in a time domain and a frequency domain. A radio frame may be formed by one or more frames in the time domain. Each of one or more frames in the time domain is also referred to as a subframe. Further, the subframe may be formed by one or more slots in the time domain. Further, the slot may be formed by one or more symbols (OFDM symbols, SC-FDMA symbols, or the like) in the time domain. Each of the radio frame, the subframe, the slot, and the symbol indicates a time unit in which a signal is transmitted. The radio frame, the subframe, the slot, and the symbol may have different corresponding names. For example, in an LTE system, the base station performs scheduling to allocate a radio resource (a frequency bandwidth, transmission power, or the like which can be used by each mobile station) to each mobile station. A minimum time unit of scheduling may be referred to as a transmission time interval (TTI). For example, one subframe may be referred to as a TTI, a plurality of consecutive subframes may be referred to as a TTI, one slot may be referred to as a TTI, or one of a plurality of mini-slots obtained by dividing one slot may be referred to as a TTI.

A resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be formed by one or more resource blocks. The structure of the radio frame described above is merely an example, and the number of subframes included in the radio frame, the number of slots or mini-slots included in the subframe, the number of symbols and resources blocks included in the slot or the mini-slot, and the number of subcarriers included in the resource block can be changed in many ways.

In the radio communication system according to the embodiment of the present invention, it is assumed that a multicarrier scheme using OFDM and a single carrier scheme using DFT-s-OFDM are applicable in uplink communication. In OFDM, it is possible to implement high-speed transmission and improve frequency usage efficiency by arranging subcarriers on a frequency. Therefore, a high throughput can be achieved by applying the multicarrier scheme using OFDM to a user equipment (the UE1 in FIG. 1) in the vicinity of the center of the cell. On the other hand, in DFT-s-OFDM, transmission is performed using a consecutive frequency band. In DFT-s-OFDM, since a fluctuation in transmission power is small, it is possible to increase an output voltage of a user equipment and achieve a wide coverage. Therefore, a wide coverage can be achieved by applying the single carrier scheme using DFT-s-OFDM to a user equipment (the UE2 in FIG. 1) in the vicinity of the cell edge.

When the multicarrier scheme can be applied to uplink communication in addition to the single carrier scheme, switching between the multicarrier scheme and the single carrier scheme may be allowed in the cell, or only the multicarrier scheme may be applied. In the embodiment of the present invention, transmission and reception of uplink signals between the base station eNB and the user equipment UE are implemented such that the base station eNB determines whether switching between the multicarrier scheme and the single carrier scheme is performed in uplink or only the multicarrier scheme is applied and notifies the user equipment UE of the determination result.

<Procedure of Uplink Signal Transmission Method>

Figure 2:
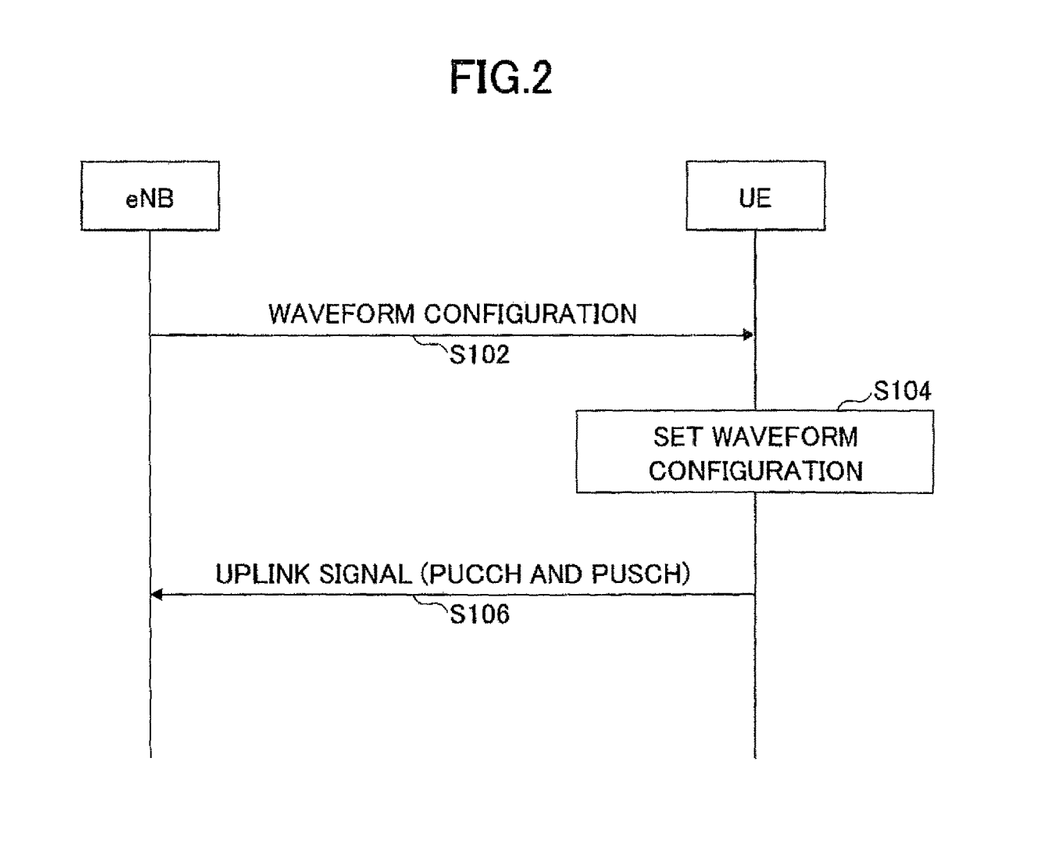
FIG. 2 is a sequence diagram of an uplink signal transmission method in a radio communication system according to an embodiment of the present invention (1/2)

FIG. 2 is a sequence diagram of an uplink signal transmission method in the radio communication system according to the embodiment of the present invention (1/2).

First, the base station eNB generates signal waveform configuration information related to either or both of the multicarrier scheme and the single carrier scheme which is applicable in uplink communication, and transmits the signal waveform configuration information to the user equipment UE (S102).

In the following description, information indicating either or both of the multicarrier scheme and the single carrier scheme which is applicable in uplink communication is referred to as "signal waveform configuration information" or a "waveform configuration". The waveform configuration may be (1) information indicating that both the multicarrier scheme and the single carrier scheme are applicable within the cell of the base station eNB, and dynamic switching is performed, (2) information indicating that both the multicarrier scheme and the single carrier scheme are applicable within the cell of the base station eNB, and semi-static switching is performed, or (3) information indicating that only the multicarrier scheme is applicable within the cell of the base station eNB. Here, the dynamic switching may be expressed as switching on a subframe basis, and, for example, indicates switching between the multicarrier scheme and the single carrier scheme through DCI. Further, the semi-static switching may be expressed as switching in a fixed duration or a variable duration longer than one subframe.

Alternatively, the waveform configuration may be (1) information indicating that both the multicarrier scheme and the single carrier scheme are applicable within the cell of the base station eNB or (2) information indicating that only the multicarrier scheme is applicable within the cell of the base station eNB. If the waveform configuration is (1) information indicating that both the multicarrier scheme and the single carrier scheme are applicable within the cell of the base station eNB, the waveform configuration may be further categorized into (1a) information indicating that that both the multicarrier scheme and the single carrier scheme are applicable within the cell of the base station eNB, and dynamic switching is performed and (1b) information indicating that both the multicarrier scheme and the single carrier scheme are applicable within the cell of the base station eNB, and semi-static switching is performed.

The waveform configuration may be provided to the user equipment UE using broadcast information. For example, the waveform configuration may be provided to the user equipment UE using an MIB or an SIB. In this case, all the user equipments UEs in the cell receive a common waveform configuration.

Alternatively, the waveform configuration may be provided to the user equipment UE using a message in a random access procedure. For example, the waveform configuration may be provided to the user equipment UE using a random access response in the random access procedure (an RA response (also referred to as a message 2)). In this case, all the user equipments UEs in the cell receive a common waveform configuration.

Alternatively, the waveform configuration may be provided to the user equipment UE using a paging message. In this case, all the user equipments UEs in the cell receive a common waveform configuration.

Alternatively, the waveform configuration may be provided to the user equipment UE using a message in a connection setup procedure with the user equipment UE such as a radio resource control (RRC) connection setup or an S1 connection setup. For example, the waveform configuration may be provided to the user equipment UE using an RRC connection setup or an RRC connection reconfiguration. For example, when the RRC connection setup is used, all the user equipments UEs in the cell receive a common waveform configuration. For example, when the RRC connection reconfiguration is used, since capability information (also referred to as a "UE capability") indicating a frequency band, a UE category, a maximum transmission rate, and the like supported by the user equipment UE can be transmitted to the base station eNB in advance as will be described later, it is possible to modify the waveform configuration depending on the user equipment UE.

Further, a waveform configuration common to the PUCCH and the PUSCH may be used, or different waveform configurations may be used for the PUCCH and the PUSCH. When different waveform configurations are used, the waveform configuration for the PUCCH and the waveform configuration for the PUSCH may be reported together using a single message or may be provided using separate messages.

Further, when one waveform configuration indicates (1) information indicating that both the multicarrier scheme and the single carrier scheme are applicable within the cell of the base station eNB or (2) information indicating that only the multicarrier scheme is applicable within the cell of the base station eNB, and another waveform configuration indicates (1a) information indicating that that both the multicarrier scheme and the single carrier scheme are applicable within the cell of the base station eNB, and dynamic switching is performed or (1b) information indicating that both the multicarrier scheme and the single carrier scheme are applicable within the cell of the base station eNB, and semi-static switching is performed, these waveform configurations may be provided together using a single message or may be provided using different messages.

The user equipment UE receives and sets the waveform configuration (S104).

As described above, the waveform configuration is provided using the broadcast information, the message in the random access procedure, the paging message, the message in the connection setup procedure, or the like. The user equipment UE sets the received waveform configuration in its own device.

If the waveform configuration is not provided, the user equipment UE may set a predetermined waveform configuration or may continuously use the previously-received waveform configuration.

For the waveform configuration, the broadcast information, the message in the random access procedure, the paging message, the message in the connection setup procedure, or the like is used, but a combination thereof may be used. When the combination is used, the user equipment UE may overwrite the previously-received waveform configuration with the latest waveform configuration or may set the waveform configuration in accordance with a predetermined priority. For example, after setting the waveform configuration included in the RRC connection reconfiguration, when the waveform configuration with different information included in the MIB or the SIB is received, a priority may be given to the waveform configuration included in the RRC connection reconfiguration, and the waveform configuration included in the MIB or the SIB may be discarded. Here, the priority using the RRC connection reconfiguration and the MIB or the SIB is merely an example, and any priority may be used.

When different waveform configurations are used for the PUCCH and the PUSCH, the user equipment UE sets the waveform configuration for the PUCCH and the waveform configuration for the PUSCH.

The user equipment UE transmits an uplink signal in accordance with the set waveform configuration (S106).

(1) When the waveform configuration indicating that both the multicarrier scheme and the single carrier scheme are applicable within the cell of the base station eNB, and dynamic switching is performed is set, the user equipment UE performs dynamic switching between the multicarrier scheme and the single carrier scheme according to the indication from the base station eNB and transmits the uplink signal. (2) When the waveform configuration indicating that both the multicarrier scheme and the single carrier scheme are applicable within the cell of the base station eNB, and semi-static switching is performed is set, the user equipment UE performs semi-static switching between the multicarrier scheme and the single carrier scheme according to the indication from the base station eNB and transmits the uplink signal. (3) When the waveform configuration indicating that only the multicarrier scheme is applicable within the cell of the base station eNB, the user equipment UE always applies the multicarrier scheme and transmits the uplink signal.

When different waveform configurations are used for the PUCCH and the PUSCH, the user equipment UE transmits uplink control information on the PUCCH in accordance with the waveform configuration for the PUCCH, and transmits uplink data on the PUSCH in accordance with the waveform configuration for the PUSCH.

Figure 3:
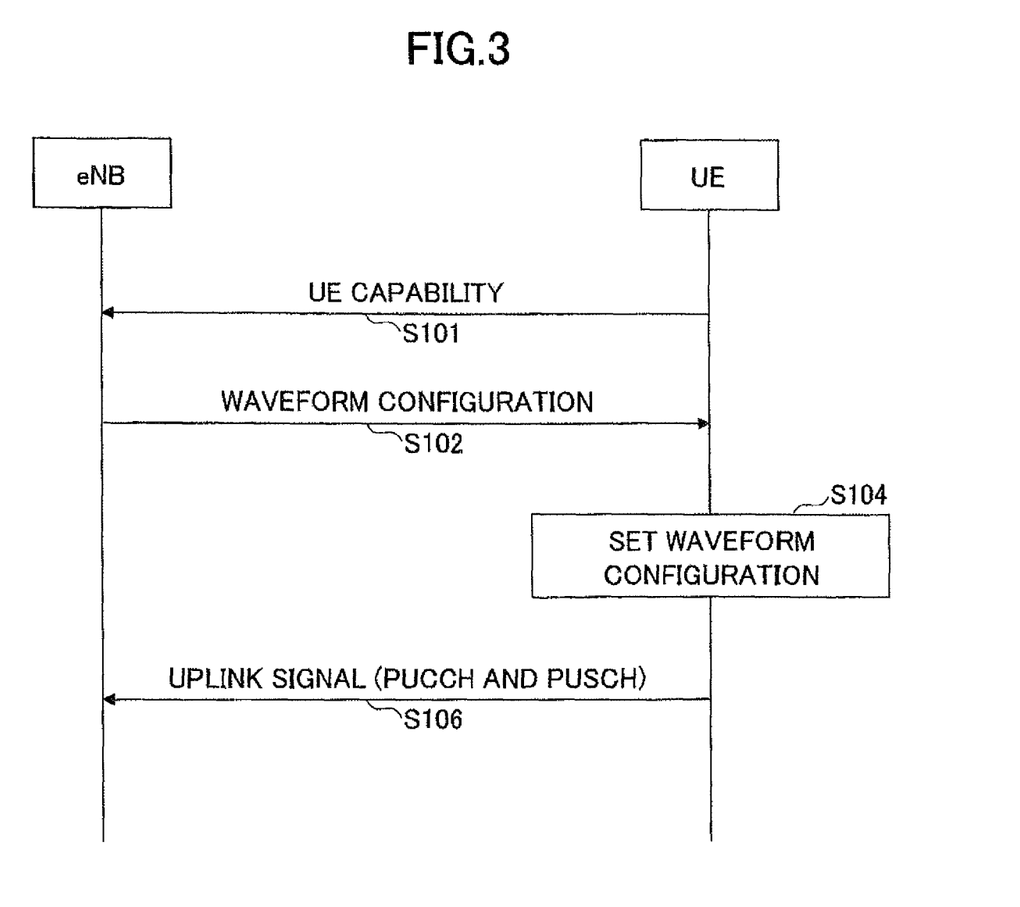
FIG. 3 is a sequence diagram of an uplink signal transmission method in a radio communication system according to an embodiment of the present invention (2/2)

FIG. 3 is a sequence diagram of an uplink signal transmission method in the radio communication system according to the embodiment of the present invention (2/2). The sequence diagram illustrated in FIG. 3 differs from the sequence diagram illustrated in FIG. 2 in that step S101 is performed before step S102. The following description focuses on a difference from the sequence diagram illustrated in FIG. 2.

First, the user equipment UE transmits capability information (a UE capability) of the user equipment UE to the base station eNB (S101).

The UE capability includes information about a frequency band, a UE category, a maximum transmission rate, and the like supported by the user equipment UE. The UE capability may further include information indicating whether static or dynamic switching between the multicarrier scheme and the single carrier scheme is possible or the like.

For example, the UE capability is transmitted to the base station eNB using a message in a connection setup procedure such as an RRC connection setup.

The base station eNB generates a waveform configuration in accordance with the UE capability and transmits the generated waveform configuration to the user equipment UE (S102).

In this case, since the waveform configuration can be set for each user equipment, the waveform configuration is transmitted using a message such as an RRC connection reconfiguration in which setting can be modified depending on the user equipment.

Thereafter, as described above with reference to FIG. 2, the user equipment UE receives and sets the waveform configuration (S104), and transmits an uplink signal in accordance with the set waveform configuration (S106).

<Functional Configuration>

Figure 4:
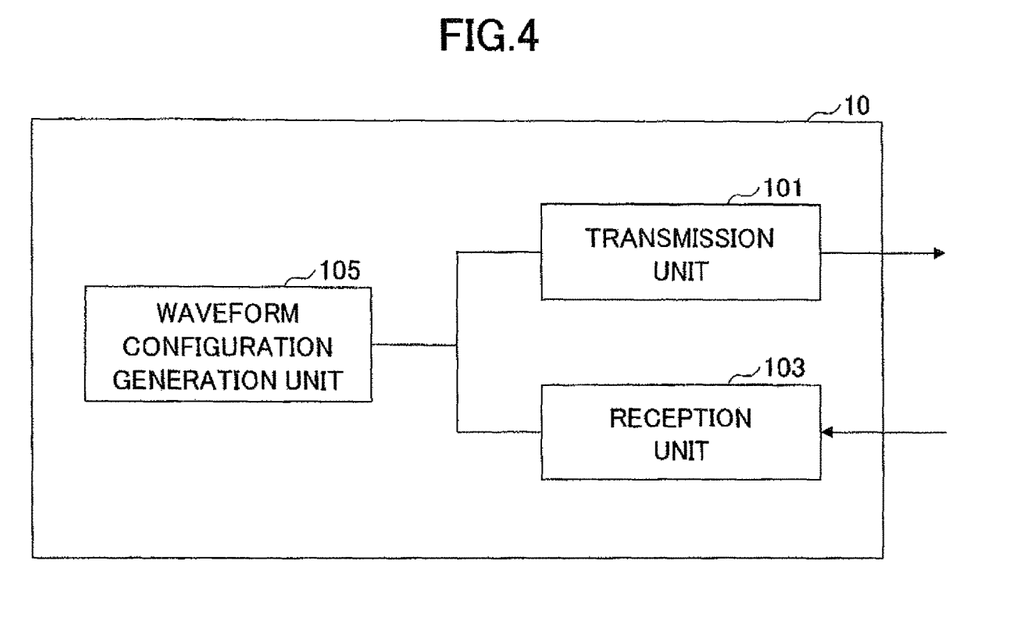
FIG. 4 is a block diagram illustrating a functional configuration of a base station according to an embodiment of the present invention.

FIG. 4 is a block diagram illustrating a functional configuration of a base station 10 according to an embodiment of the present invention.

The base station 10 including a transmission unit 101, a reception unit 103, and a waveform configuration generation unit 105.

The transmission unit 101 generates various kinds of downlink signals to be transmitted from the base station 10 and transmits the generated downlink signals to the user equipment UE. The transmission unit 101 transmits a waveform configuration generated by the waveform configuration generation unit 105 described below to the user equipment UE.

The reception unit 103 receives various kinds of uplink signals from the user equipment UE. The reception unit 103 receives an uplink signal (uplink control information and uplink data) transmitted from the user equipment UE in accordance with the waveform configuration. Further, the reception unit 103 may receive a UE capability from the user equipment UE so that the waveform configuration can be set for each user equipment.

The waveform configuration generation unit 105 sets the waveform configuration to be applied in the cell. The waveform configuration generation unit 105 may generate a waveform configuration common to all the user equipments in the cell or may generate a waveform configuration specific to each user equipment, for example, in accordance with the UE capability. Further, the waveform configuration generation unit 105 may generate a waveform configuration common to the PUCCH and the PUSCH or may generate different waveform configurations for the PUCCH and the PUSCH.

Figure 5:
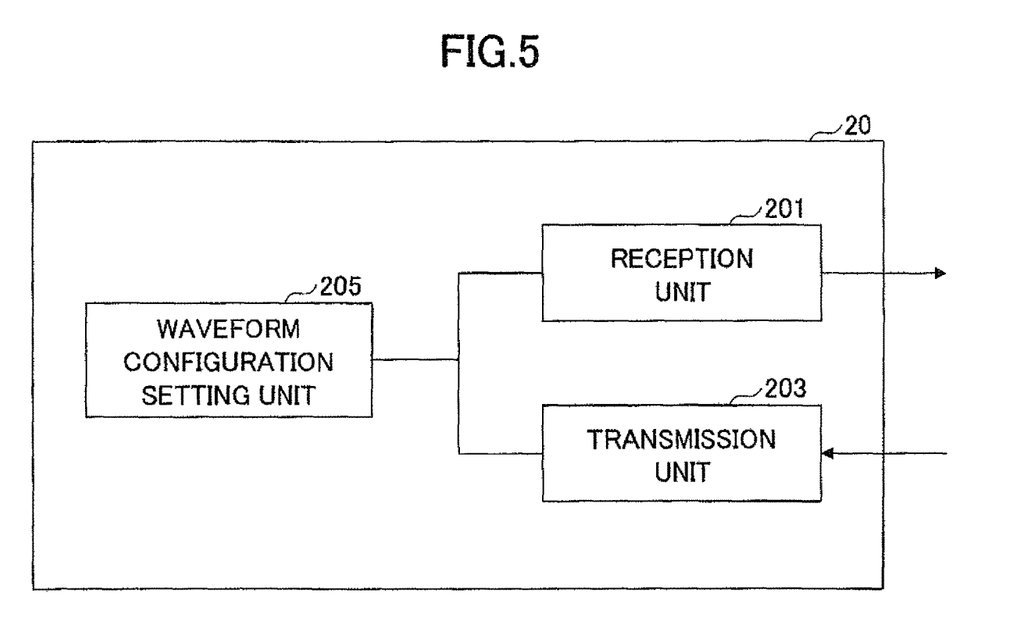
FIG. 5 is a block diagram illustrating a functional configuration of a user equipment according to an embodiment of the present invention.

FIG. 5 is a block diagram illustrating a functional configuration of a user equipment 20 according to the embodiment of the present invention.

The user equipment 20 has a reception unit 201, a transmission unit 203, and a waveform configuration setting unit 205.

The reception unit 201 receives various kinds of downlink signals from the base station eNB. The reception unit 201 receives the waveform configuration transmitted from the base station eNB. The reception unit 201 may receive the waveform configuration common to the PUCCH and the PUSCH or may receive different waveform configurations for the PUCCH and the PUSCH.

The transmission unit 203 generates various kinds of uplink signals to be transmitted from the user equipment 20 and transmits the generated uplink signals to the base station eNB. The transmission unit 203 transmits the uplink signal in accordance with the waveform configuration set in the waveform configuration setting unit 205 described below. Further, the transmission unit 203 may transmit a UE capability to the base station eNB. If the waveform configuration is not provided from the base station eNB, the transmission unit 203 may transmit the uplink signal in accordance with a predetermined waveform configuration or may transmit the uplink signal in accordance with the previously-received waveform configuration. When different waveform configurations are used for the PUCCH and the PUSCH, the transmission unit 203 transmits the uplink control information on the PUCCH in accordance with the waveform configuration for the PUCCH and transmits the uplink data on the PUSCH in accordance with the waveform configuration for the PUSCH.

The waveform configuration setting unit 205 sets the waveform configuration received by the reception unit 201. The waveform configuration setting unit 205 may overwrite the previously-received waveform configuration with the latest waveform configuration or may set the waveform configuration in accordance with a predetermined priority. Further, the waveform configuration setting unit 205 may set the common waveform configuration for the PUCCH and the PUSCH or may set different waveform configurations for the PUCCH and the PUSCH.

<Hardware Configuration>

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 6:
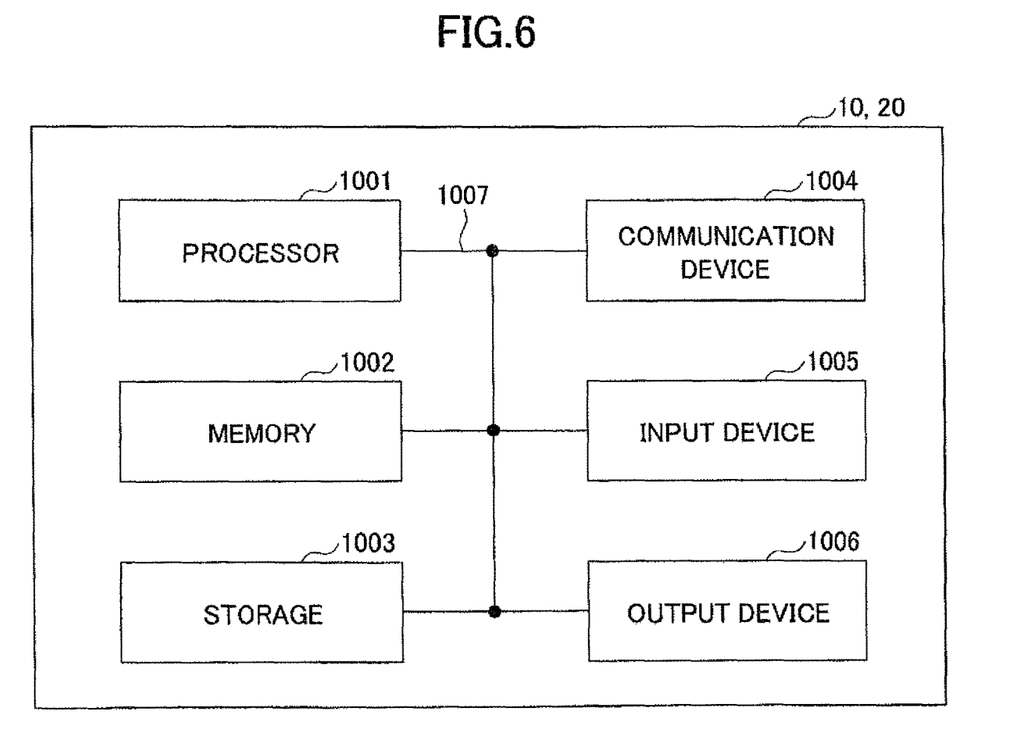
FIG. 6 is a diagram illustrating an example of a hardware configuration of a radio communication device according to an embodiment of the present invention.

For example, the base station, the user equipment, or the like according to the embodiment of the invention may function as a computer that performs an uplink signal transmission method according to this embodiment. FIG. 6 is a diagram illustrating an example of a hardware configuration of the base station 10 or the user equipment 20 according to this embodiment. Each of the base station 10 and the user equipment 20 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 10 or the user equipment 20 may include one or a plurality of devices illustrated in FIG. 6 or may not include some of the devices.

Each function of the base station 10 and the user equipment 20 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the waveform configuration generation unit 105 in the base station 10, the waveform configuration setting unit 205 in the user equipment 20, and so on may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the waveform configuration generation unit 105 in the base station 10 and the waveform configuration setting unit 205 in the user equipment 20 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a synchronization signal transmission method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 101, the reception unit 103, the reception unit 201, and the transmission unit 203, and the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

Each of the base station 10 and the user equipment 20 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Effects of Embodiment of Present Invention

According to the embodiment of the present invention, it is possible to implement transmission and reception of uplink signals between a base station eNB and a user equipment UE in a radio communication system in which a single carrier scheme and a multicarrier scheme are applicable in uplink communication, by setting a suitable scheme in uplink communication.

Further, the waveform configuration can be transmitted and received through existing message exchange between the base station eNB and the user equipment UE, and when three types of waveform configurations, that is, (1) information indicating that both the multicarrier scheme and the single carrier scheme are applicable within the cell of the base station eNB, and dynamic switching is performed, (2) information indicating that both the multicarrier scheme and the single carrier scheme are applicable within the cell of the base station eNB, and semi-static switching is performed, and (3) information indicating that only the multicarrier scheme is applicable within the cell of the base station eNB are used, the waveform configuration can be indicated using a 2-bit of information. Further, when two types of waveform configurations, that is, (1) information indicating that both the multicarrier scheme and the single carrier scheme are applicable within the cell of the base station eNB and (2) information indicating that only the multicarrier scheme is applicable within the cell of the base station eNB are used, the waveform configuration can be indicated using a 1-bit of information. Furthermore, (1a) information indicating that that both the multicarrier scheme and the single carrier scheme are applicable within the cell of the base station eNB, and dynamic switching is performed and (1b) information indicating that both the multicarrier scheme and the single carrier scheme are applicable within the cell of the base station eNB, and semi-static switching is performed can be indicated by a 1-bit of information. As a result, it is also possible to reduce the information amount of the waveform configuration when the setting of the dynamic switching and the semi static switching is changed.

Further, setting of the waveform configuration specific to the user equipment can be implemented by setting the waveform configuration in consideration of the UE capability.

Furthermore, when different waveform configurations are set for the PUCCH and the PUSCH, a flexible setting can be implemented, and high speed communication and large capacity can be achieved, for example, by always applying the multicarrier scheme to the data channel.

<Supplement>

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims the benefit of priority of Japanese Patent Application No. 2016-215707 filed on Nov. 2, 2016, the entire contents of which are hereby incorporated by reference.

DESCRIPTION OF NOTATIONS 10 base station
101 transmission unit
103 reception unit
105 waveform configuration generation unit
20 user equipment
201 reception unit
203 transmission unit
205 waveform configuration setting unit
1001 processor
1002 memory
1003 storage
1004 communication device
1005 input device
1006 output device

The invention claimed is:

1. A terminal, comprising:
a receiver that receives first radio resource control (RRC) signaling from a base station, the RRC signaling comprising a configuration with respect to application of discrete Fourier transformation;
a processor that determines whether discrete Fourier transformation is to be applied to a physical uplink shared channel (PUSCH) according to the RRC signaling and determines whether discrete Fourier transformation is to be applied to a physical uplink control channel (PUCCH) according to the RRC signaling; and
a transmitter that transmits an uplink signal on the PUSCH and an uplink signal on the PUCCH.

2. The terminal according to claim 1, wherein the processor performs a predetermined operation, when the RRC signaling is not provided, and
determines whether discrete Fourier transformation is to be applied to the PUSCH according to the RRC signaling, when the first RRC signaling is provided.

3. The terminal according to claim 2, wherein the processor determines whether discrete Fourier transform-spread-orthogonal frequency division multiplexing (DFT-s-OFDM) is to be applied to the PUSCH.

4. The terminal according to claim 1, wherein the processor determines whether discrete Fourier transform-spread-orthogonal frequency division multiplexing (DFT-s-OFDM) is to be applied to the PUSCH.

5. An uplink signal transmission method in a terminal communicating with a base station, comprising:
receiving radio resource control (RRC) signaling from the base station, the RRC signaling comprising a configuration with respect to application of discrete Fourier transformation;
determining whether discrete Fourier transformation is to be applied to a physical uplink shared channel (PUSCH) according to the RRC signaling;
determining whether discrete Fourier transformation is to be applied to a physical uplink control channel (PUCCH) according to the RRC signaling; and
transmitting an uplink signal on the PUSCH and an uplink signal on the PUCCH.

6. A system comprising a base station and a terminal, wherein:
the base station comprises:
a transmitter that transmits radio resource control (RRC) signaling, the RRC signaling comprising a configuration with respect to application of discrete Fourier transformation; and
the terminal comprises:
a receiver that receives the RRC signaling from the base station;
a processor that determines whether discrete Fourier transformation is to be applied to a physical uplink shared channel (PUSCH) according to the RRC signaling and determines whether discrete Fourier transformation is to be applied to a physical uplink control channel (PUCCH) according to the RRC signaling; and
a transmitter that transmits an uplink signal on the PUSCH and an uplink signal on the PUCCH.

* * * * *